(12) United States Patent  (10) Patent No.: US 7,707,218 B2
Gocht et al.  (45) Date of Patent: Apr. 27, 2010

(54) MOBILE QUERY SYSTEM AND METHOD BASED ON VISUAL CUES

(75) Inventors: Russell Gocht, Bedford, MA (US); John Puopolo, Sudbury, MA (US)

(73) Assignee: Mobot, Inc., Lexington, MA (US)

( * ) Notice: Subject to any disclaimer, the term of this patent is extended or adjusted under 35 U.S.C. 154(b) by 1021 days.

(21) Appl. No.: 11/106,306

(22) Filed: Apr. 14, 2005

(65) Prior Publication Data

US 2005/0261990 A1  Nov. 24, 2005

Related U.S. Application Data

(60) Provisional application No. 60/562,855, filed on Apr. 16, 2004.

(51) Int. Cl.
G06F 7/00 (2006.01)
(52) U.S. Cl. .................. 707/758; 707/781; 707/784
(58) Field of Classification Search .............. 707/1, 707/3, 10, 104.1, 201, 758, 781, 784; 455/412.1, 455/422.1, 445, 466; 715/234; 705/67
See application file for complete search history.

(56) References Cited

U.S. PATENT DOCUMENTS

| | | | | |
|---|---|---|---|---|
| 6,429,812 | B1 * | 8/2002 | Hoffberg | 342/357.1 |
| 6,590,588 | B2 | 7/2003 | Lincke et al. | |
| 6,636,259 | B1 * | 10/2003 | Anderson et al. | 348/211.3 |
| 6,650,998 | B1 * | 11/2003 | Rutledge et al. | 701/211 |
| 6,651,053 | B1 | 11/2003 | Rothschild | |
| 6,753,883 | B2 | 6/2004 | Schena et al. | |
| 6,766,363 | B1 | 7/2004 | Rothschild | |
| 7,016,532 | B2 | 3/2006 | Boncyk et al. | |
| 7,016,940 | B2 * | 3/2006 | Matsuda et al. | 709/206 |
| 7,092,568 | B2 * | 8/2006 | Eaton | 382/181 |
| 7,231,605 | B1 * | 6/2007 | Ramakesavan | 715/734 |
| 7,330,189 | B2 * | 2/2008 | Nichogi et al. | 345/589 |
| 7,341,196 | B2 * | 3/2008 | Sandrini et al. | 235/487 |

(Continued)

FOREIGN PATENT DOCUMENTS

EP    0920179 A2    6/1999

(Continued)

OTHER PUBLICATIONS

Supplementary European Search Report issued Jan. 28, 2009, in EP 05 73 8190.

(Continued)

*Primary Examiner*—Miranda Le
(74) *Attorney, Agent, or Firm*—Brian M. Dingman; Mirick, O'Connell, DeMallie & Lougeé

(57) ABSTRACT

A mobile query and response system and method that is based on visual cues, in which a user captures and transmits an image with a networked mobile device such as a cell phone or PDA with image capture and transmission capabilities. Searchable records that include stored image data and response information associated with such data are provided. The image transmitted by the user is used to perform a search of the records, to find in the records an image that matches the transmitted image. If a match is found, the response information associated with the stored image data for the matching image is retrieved, and that response information is used to send a reply to the user.

33 Claims, 5 Drawing Sheets

U.S. PATENT DOCUMENTS

| | | | |
|---|---|---|---|
| 7,466,357 B2* | 12/2008 | Myojo | 348/333.05 |
| 2001/0029175 A1* | 10/2001 | Sellen et al. | 455/412 |
| 2002/0016196 A1* | 2/2002 | Orak | 463/9 |
| 2002/0019784 A1 | 2/2002 | Ritz | |
| 2002/0049819 A1 | 4/2002 | Matsuda et al. | |
| 2002/0187774 A1 | 12/2002 | Ritter et al. | |
| 2002/0194061 A1* | 12/2002 | Himmel et al. | 705/14 |
| 2002/0194066 A1* | 12/2002 | Shultz | 705/14 |
| 2003/0023975 A1* | 1/2003 | Schrader et al. | 725/51 |
| 2003/0043271 A1* | 3/2003 | Dantwala | 348/207.1 |
| 2003/0122940 A1* | 7/2003 | Myojo | 348/231.2 |
| 2004/0006509 A1* | 1/2004 | Mannik et al. | 705/14 |
| 2004/0030994 A1 | 2/2004 | Hui et al. | |
| 2005/0011957 A1 | 1/2005 | Attia et al. | |
| 2005/0050165 A1 | 3/2005 | Hamynen | |
| 2005/0055281 A1 | 3/2005 | William | |
| 2005/0055450 A1* | 3/2005 | Gang | 709/228 |
| 2005/0064900 A1 | 3/2005 | Goris et al. | |
| 2005/0185060 A1 | 8/2005 | Neven | |
| 2006/0012677 A1 | 1/2006 | Neven et al. | |
| 2007/0073718 A1* | 3/2007 | Ramer et al. | 707/10 |
| 2008/0009268 A1* | 1/2008 | Ramer et al. | 455/412.1 |

FOREIGN PATENT DOCUMENTS

| | | |
|---|---|---|
| EP | 0920179 A3 | 9/2000 |
| WO | WO 01/37591 A1 | 5/2001 |
| WO | 02082799 A2 | 10/2002 |
| WO | WO 03/001435 A1 | 1/2003 |

OTHER PUBLICATIONS

Wen, Ji-Rong, et al., "Query Clustering Using User Logs," ACM Transactions on Information Systems, 20(1):59-81, Jan. 2002.

* cited by examiner

300

MOBILE QUERY SYSTEM AND METHOD BASED ON VISUAL CUES

CROSS REFERENCE TO RELATED APPLICATION

This application claims priority of Provisional application Ser. No. 60/562,855, filed on Apr. 16, 2004.

FIELD OF THE INVENTION

This invention relates to human interaction with observable images using a mobile query system based on visual cues.

BACKGROUND OF THE INVENTION

Advertisers desire consumers to purchase their products/services, or perhaps take some other action, in direct response to advertisements. However, in most cases there is no direct, measurable connection between the advertisement and the consumer's actions. Accordingly, it is difficult for advertisers to measure the effectiveness of their advertising campaigns.

SUMMARY OF THE INVENTION

This invention relates to human interaction with observable images using a mobile query system based on visual cues. The visual cue which piques the user's interest may be from any type of visual content, such as advertisements, logos, signs and editorial, or may be an everyday object such as a flower, a landmark, a pet, or a human face. Visual cues are observable images, which may include text and/or graphics and/or objects. The medium may be varied, such as magazine, newspaper, billboard, poster, catalog, direct mail piece, product packaging, building, clothing, or blimp. The observable image may be rendered through various means, such as print on paper or fabric, back lit on a display, or electronic, as with TV, or the observable image may be an everyday object.

Modern mobile phones include many new capabilities based on the availability of wireless data services. These services enable the transfer of text, audio, image, and video information between the mobile phone and another system. Users of mobile phones are able to use applications which improve the utility of the device, such as, receiving news alerts, sharing pictures with friends, playing games, and retrieving music to listen to. Camera phones introduce a new source of information gathering capability available to the mobile phone user.

The inventive mobile query system and method makes use of a networked mobile device with embedded image capture, such as a camera phone, a PDA with an integrated or attached camera, or digital camera with wireless data connectivity. The invention also makes use of wireless network data services. These services are based on a layered set of networking protocols. Picture messaging is a common application which makes use of these networks and is available to users of camera phones. The picture messaging application provides for including a digital image from the camera (typically a recent photo taken by the user) in a message to be sent from the wireless mobile device to a remote device, e.g. to friends and family, to an online personal photo album, or to an online mobile web log. Users specify the recipient by entering the recipient's mobile phone number or email address. Users may also select the destination for the picture message from their personal contacts list on the mobile device, or from a configured list of well known destinations, such as a branded photo management service. The user's mobile phone number is included in all messages sent and this number is available to the recipient for subsequent contact, either through similar messaging, a voice call, or pushing mobile web content. Those skilled in the art will recognize Multimedia Messaging Services (MMS) as an industry standard protocol and service specification for transmitting messages containing text and image data, as well as other types of digital content. MMS based services also include gateway functions to connect to standard internet messaging applications and services, through protocols such as SMTP. Picture messaging is most often implemented on MMS, but some wireless operators have alternate implementations based on other internet protocols such as SMTP or HTTP.

The invention also makes use of text messaging services which are available to mobile phone users on wireless data networks. Those skilled in the art will recognize Short Message Service (SMS) as an industry standard protocol and service specification for transmitting messages containing text and binary information such as URLs and download/payment mechanisms. SMS based services also include gateway functions to connect to standard internet messaging applications and services, through protocols such as SMTP.

Image indexing systems that include visual search algorithms provide a mechanism to store a plurality of images and search among this set for an image similar to an input image. These systems provide a rank order search result and provide an absolute score for each item returned. This score is an indicator of degree of match. When the absolute score of the item with highest rank is low, these systems provide a threshold mechanism which can be used to determine when the item returned with highest rank, indicative of best match, is, in fact, not a match at all. The threshold mechanism relies on the fact that the numerical distance between the scores of two non-matching images is probabilistically much smaller than the numerical distance between the scores of the matching image and a non-matching image. Visual search systems are tuned based on image application type. For instance, a visual search system would be tuned differently for each of the following applications: trademark logo search using bi-tonal images; facial recognition using gray-scale images; magazine ad search based on color images. Visual search systems can be augmented by human operators who make final determination of the best match or no match when cases arise where the automated system indicates that the best match is close to the threshold.

Personalization and user registration systems, which enable individual users to establish a personal account with configurable preferences and store pertinent user information, are commonplace components of internet web sites such as e-commerce sites, portals, news services, home banking, etc. These systems are accessed by users through a web browser and provide for initial registration and maintenance of a user's personal profile. These systems provide appropriate security and ensure the privacy of user information. If so configured, these systems can also be accessed through the mobile internet using a mobile handset web browser.

Marketing automation systems provide the ability to develop, execute, manage, and measure consumer targeted marketing programs which include both digital and traditional forms of consumer marketing. Facilities are provided to create customized responses to consumer requests, based on selected input variables and business rules. These systems manage both human and automated work flow. Typical responses are in the form of email, postal mail, or phone call. A simplified example of a business rule is "to the first 1000 unique mail respondents of the August 1972 issue of Life Magazine ad page 38 for Swanson TV Dinners, send a '2 for 1 coupon' and enter into Disneyland Sweepstakes". Combining mobile messaging capabilities with this type of system enables mobile marketing to be included in the palate of possible fulfillment mechanisms.

The practice of creating a personal log of thoughts and activities available on a web site is called web logging, or blogging. A mobile web log is called a moblog. A moblog is created when a user enters text and captures images on a mobile phone and uploads the data to a special purpose blog, most typically by sending an appropriately addressed picture message. Blogs and moblogs may also include links to relevant content on the internet. People who maintain blogs or moblogs derive value from keeping a record of their thoughts and activities. Increasingly this record includes multimedia content and links. The usefulness of a blogging mechanism is increased as it becomes easier to include this additional information.

A common practice in the goods and services marketing industry is direct response marketing, which is used to gather information about individual consumers and their specific interest in a product, service, or event, as well as affect their buying behavior. A direct response marketing campaign involves awareness creation or direct solicitation, and one or more response channels. Awareness creation can take many forms. Examples are: direct mail, TV or radio advertisements, e-mail messages, print advertisements in magazines or newspapers, posters, or billboards. There are also many possible response channels. Examples are: mail, telephone, e-mail message, retail store visit, "bingo card", and web site. The campaign may include incentives in an attempt to increase the response rate of the target market. Examples are: contests, quizzes, free samples, and coupons.

An objective of direct response marketing is to generate customer leads, i.e., information about potential customers. At a minimum, this information would include at least one identifier by which the customer could be subsequently contacted. Types of identifiers include home or business telephone number, home or business address, mobile phone number, e-mail address, and internet chat screen name. Using one or more of these identifiers advertisers will follow up with techniques intended to yield a purchase by the consumer. In some cases these techniques are intended to "persist the impression" of the brand, while in others there will be direct solicitation to make a purchase.

Contests which require customer participation are popular forms of direct marketing. An example of a program based on visual cues would be one where an image of a particular subject, such as a product package, store sign, or logo was required to be included in a picture to participate in the contest or brand promotion. An automated system, such as disclosed herein, receives entries submitted by camera phones and processes image content, returning a response to the user that the entry was accepted or rejected. Rejects would occur when the subject was not found in the image and the user would be informed in the response as to how to participate in the promotion.

Customer lead data is also used to improve the advertiser's understanding of the target market. In this case, additional information which is gathered from consumers is viewed and analyzed in aggregate to discover patterns or trends. This additional information includes "hard data", personal information such as age, sex, and location, as well as "soft data", such as favorite sport or hours per week watching TV.

The effectiveness of direct response marketing campaigns is measured by response rate. Response rates are studied for the various mechanisms and are shown to vary considerably, but are most often well below 1% (less than 1% of targeted customers respond). In some cases it is possible to accurately measure response rate, for instance, a customer responds directly to a specific e-mail solicitation. In other cases, it is impossible to determine what prompted a user to respond, for instance, a user visits a corporate web address found on a print advertisement or buys a certain pair of shoes two weeks later in a retail store. The value of the medium and response channel is increased when it can be directly measured.

Advertisers use words, text, visual ad formats and brand logos to create lasting impressions in consumers' minds. Costs to advertisers are directly related to volume. For example, magazine circulation or venue traffic will directly relate to the cost for the advertiser to place the ad or banner. This cost is typically quoted by the media outlet as CPM, or cost per thousand impressions. The volume estimates used to justify CPM rates do not guarantee that number of impressions, rather, for a given type of media outlet, the volume data serves as a comparative statistic. The value of an advertising medium is increased when it can be proven with specific statistics that ad impressions are persisted longer. The value of an advertising medium is also increased when gross estimates of impressions are supplemented with specific, verifiable statistics of actual impressions. The value of an advertising medium is increased again when a static ad such as a magazine page or shopping mall poster can be practically connected to other media via an electronic mechanism such as the inventive mobile query system.

Print media advertisements and out-of-home advertisements often include a call-to-action. There is a spectrum of methods used to convey the call-to-action. In some instances it is overt and unmistakable, such as "call this number today to order", and in other instances the message is more subtle. In most advertising in these formats there is a mechanism for the consumer to follow up on interest in the ad. Typically this is in the form of a phone number or web site address. A person who desires to respond to the call-to-action or seek more information about the product, service, or event, must call the number or seek other sources such as a web site. It is often the case that a person will not respond, even though there may be interest, either because the response mechanism is not convenient, the response mechanism does not provide what the person is interested in, or, as time passes, the person forgets about the desire to respond. The mobile query system of the invention allows the user to engage when interest is piqued and provides a response that is based on user selectable preferences, provides value to the user.

The use of cross-media marketing in the advertising and brand management industries is on the rise. Tie-ins between radio, TV, print, direct mail, and internet media outlets are commonplace in many advertising campaigns. The mobile phone is a recent addition to the list of possible outlets, as evidenced by the use of text messaging to involve consumers in quests for prizes and access to information. Mobile marketing in its simplest form, is the advent of advertising on the mobile phone by sending the consumer text or multimedia messages. Likewise, mobile commerce solutions allow consumers to make purchases from their mobile phone using the mobile web.

Wireless data services offered by wireless network operators are based on protocols such as GSM/GPRS, CDMA/1xRTT, WiFi (802.11a/b/g), EDGE, CDMA2000, WCDMA. Wireless data networks may also provide location-based services wherein it is possible to determine the location of the mobile subscriber or determine the billing zip code of the subscriber.

The invention features a system and method which enables a user to use a camera phone to indicate their interest in a product, service, event, or editorial content based on a visual cue, or to engage in a specific marketing promotion or other activity which includes a visual cue. A response based on that expressed interest or engagement is provided to the user. The visual cue need not be altered for this purpose. In a typical use, the user takes a picture of the item of interest and sends the image data via a wireless data service to the mobile query service, having the effect of requesting a response for that visual cue or indicating the user's desire to participate in the promotion. When a query is received by the mobile query service the image data in the message is used to perform a lookup for a match in an image indexing system. The image indexing system is maintained with a plurality of images (precisely, data extracted from said images) and associated with each image is a response function. Examples of commercial image indexing and visual search systems include Scene and Logo Classifier from Imagen Inc., Espion SDK from Idee Inc., PixServe and PixSearch from PixLogic, and ViPR from Evolution Robotics. Responses may be automatically generated and directly delivered to the user, or trigger third-party actions on behalf of the user. A typical response to the user is a mobile text message thanking the user for their interest in the product and providing additional information about the product or where to find additional information. Examples of other types of possible responses are sending an e-mail or postal mail to the user containing product information, sending the user mobile multimedia advertising in the form of an image or audio/video clip, entering the user in the advertised contest or sweepstakes, sending the user an electronic or paper coupon, sending the user directions to the closest retail outlet or specific event venue, enabling the user to directly purchase a product or service via a re-direction to the specific purchase page on a mobile commerce website, providing the user with information on the best purchase price currently available on the internet, providing the user with a free sample, having the user vote or take a quiz, adding appointments or reminders to the user's mobile phone calendar or other electronic calendar, having a customer service representative call the user, or creating a blog entry in the user's blog or moblog which links corresponding online content.

Queries from consumers through this mechanism is, in advertising industry terms, a direct response channel. The usefulness and value to the advertiser or media outlet of a direct response mechanism is increased as additional information about the consumer is available. The invention provides for all user queries to be logged in a database. Additional information is also logged, if available. Examples are originating mobile phone number, date/time of request, date/time of image capture, mobile location when the request was made, user profile (e.g., age, sex, home address, work/school address, contact info), and type of responses provided. If a response involves subsequent interaction by the user, for example, purchasing a product, then the results of this interaction are also logged, if available. Reports are then generated from the database to provide varying degrees of detail about consumer interest and patterns. These reports are created for the benefit of specific media outlets and advertisers. For example, a report to a magazine publisher provides information about reader interest and interaction in products advertised or articles read. This information would include demographic data derived from the database. Lead generation reports include information about specific readers who made a query on a particular ad.

The value of the logging and reporting mechanism is enhanced when it is possible to identify the media outlet which is the source of the user request. For example, an advertiser will often run identical ad copy in several magazines and newspapers contemporaneously, however a publisher, as well as the advertiser, will be interested to know that the subscriber made the query based on the ad in a particular publication. The invention provides for a mode of operation where identifying an issue of a magazine is performed using the magazine cover as the identifier of that particular issue. This mode is similar to the general purpose visual cue matching system described above, however until the user has indicated the magazine issue in use, normal queries will return an error response message. Prior to making normal queries of specific pages from the magazine, the user would first make a request based on the cover of that magazine. Similar to normal use, the user would take a picture of the cover and send it to the service. The system would respond with a text message to the user indicating that that magazine was recognized and supported, and to proceed with normal queries. This action would create a temporary user state in the system and subsequent queries from that user would include the magazine name, and date of issue, in the resulting log entry. This operational mode is supported by maintaining magazine cover image data entries in the database. Normal user queries will search these entries first, to determine if the user state should be switched to a different magazine. In this way, when a user switches between magazines no special action is required apart from requesting a new magazine as described above.

The invention provides for alternate means of identifying the media outlet. In one alternate, the service provides a unique destination address for queries originating from a specific media outlet, such as a magazine or newspaper. This address may be in the form of email address or phone number (including short-codes), or alias for either.

In a second alternate, the system derives the most likely media outlet by tracking and analyzing current and historic usage patterns of a given user where clusters of queries are analyzed for matches which are singularly or compositely unique to a specific media outlet. For instance, if a match yields only one source magazine, then it can be inferred that queries closely clustered in time are from this same magazine if and only if each of the queries in the cluster are also known to be sourced in that magazine issue. In the case where there are multiple possible sources for all matches in a cluster, then the cluster is analyzed for a source unique to the entire set. Other parameters used to support the inference process include historical usage patterns of the user, circulation data for probable sources, issue date for probable sources, and location of current queries.

In a third alternate, the user chooses the media outlet from a list in an interactive menu on the user's mobile phone.

If the media outlet is out-of-home, the date/time and location of a query are used to pinpoint the venue and event where the query originated, which is used to uniquely identify a specific media outlet.

The invention also provides for the maintenance of the image indexing system. Image data used to support the matching function is added to, and deleted from the system on a regular basis. Associated with each image record is a media outlet source and, if applicable, an advertiser source. The process of inserting new ad copy ensures that identical ads are not duplicated in the system by first searching the existing database for the new ad. In the case where an identical ad runs in multiple magazines there will be multiple media outlet sources associated with the image data record. When identical out-of-home banner or poster style ads are on display in multiple locations, there may be multiple locations associated with the image data record.

The invention also includes the capability of customizing the response function to each query type (magazine ad, editorial, outdoor poster, product package, etc.), and to have multiple possible responses defined per query, where the actual response is determined by user preference. The maintenance facility of the image index system supports this customization by providing for the definition of multiple possible response types to be associated with each image data record. Examples of possible response types are delivery method (email, mobile text message, mobile multimedia message, mobile web connection, voice call, postal, or combination), include directions to nearest retail outlet, search for coupons and rebates, automatically register for sweepstakes, search for and send free samples, create blog entries linking online magazine editorial content, connect real-time to preferred mobile internet retailer, or send mobile content such as audio clips or graphics. Response types are often combined to define the complete response function. The method provides for personalizing the system for each user by allowing the user to select preferences for how the service responds to different types of queries. For example, send a calendar reminder message as an email for ads which are event based. These preferences are set by logging on to the user's service account web page, via either the internet and a web browser on a personal computer, or the mobile internet and a mobile web browser on a mobile handset. In some cases these static preferences may be augmented by a real-time interactive selection by the user via the mobile internet. Interactive examples, prompted by a specific initial response, include participating in quizzes or voting, playing an online game, providing specific contest entry information, or overriding static preferences. Examples of protocols which support mobile interactive prompting are two-way SMS, WAP Push, WAP Bookmarks, and SMS links to WML or XHTML.

Users of the service are made aware of its availability for any given media outlet through various mechanisms. Examples include, specific editorial content describing the service, specific ads over various media describing the service, specific and unique to this service branded logo identifier on supported ads, specific ad or editorial content included with the online version of the magazine, messages sent directly to the user's mobile phone, or partner marketing programs with wireless carriers and/or mobile handset manufacturers.

Users of the service can also use a digital camera to capture an image, transfer the image to a personal computer, and send the image data to the service via the internet. This has a similar effect as sending a query using a mobile phone.

BRIEF DESCRIPTION OF THE DRAWINGS

Other objects, features and advantages will occur to those skilled in the art from the following description of the preferred embodiments and the accompanying drawings in which.

DETAILED DESCRIPTION OF THE PREFERRED EMBODIMENTS

Figure 1:
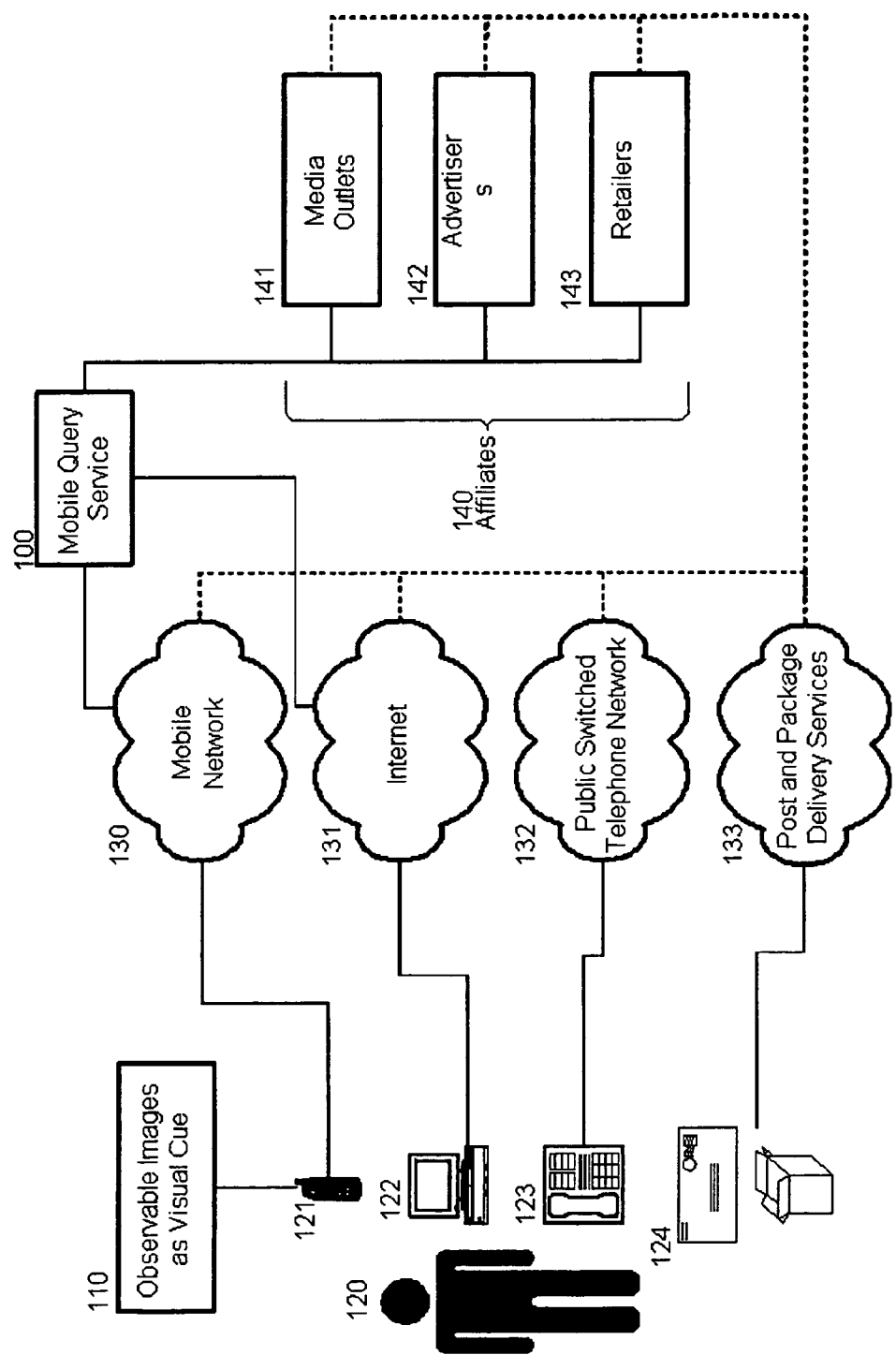
FIG. 1 is a schematic diagram of the preferred embodiment of the inventive mobile query system.

In FIG. 1, mobile user 120 sees a visual cue (text and/or graphics) 110 and uses camera phone 121 to take a picture of the visual cue. Mobile user 120 sends the picture to the mobile query service 100 using the mobile network 130. Mobile query service 100 processes the query. If the mobile user 120 is not known to the mobile query service 100 then a response text message is sent via the mobile internet 130 to camera phone 121 informing the mobile user 120 how to register to use mobile query service 100. In some cases, the initial picture message is sufficient to register mobile user 120 since only the user's mobile number is required. If the visual cue 110 is not known to the mobile query service 100 then a response text message is sent via the mobile internet 130 to camera phone 121 informing the mobile user 120 how to use the mobile query service 100 and where to find additional information on currently supported visual cues. If both the visual cue 110 and the mobile user 120 are known to the mobile query service 100 then a response text message is sent via the mobile internet 130 to camera phone 121 informing mobile user 120 that the query was successful and indicating the actions which have been triggered by this query. In some cases, this response text message is the entirety of the response and includes complete information to fulfill the query. An alternate response message delivery option is available if mobile user 120 enables this option with mobile query service 100. In this case the response is sent as an email response, instead of, or in addition to, a text message response. This optional email response is sent by mobile query service 100 through the internet 131 to mobile user 120 who accesses internet email services through computer terminal 122. This email response may be identical in content to the corresponding text message response, or it may contain additional or different content.

Mobile query service 100 can take input from a variety of sources such as media outlets 141, advertisers 142, and retailers 143, or agents acting on their behalf, and collectively referred to as affiliates 140. This input can include visual cues in the form of digital image representations or physical reproductions, and/or text. This input may also includes corresponding information needed for the fulfillment of a successful query in the form of actions to take and appropriate responses to generate, for each visual cue. Actions and responses may be carried out by either the mobile query service 100 or the affiliates 140.

It is common for affiliates 140 to contact individual prospective customers through post and package delivery services 133, the public switched telephone network 132, the internet 131, and the mobile network 130. In this invention the mobile user 120 is an individual customer/prospective customer and the contact by affiliates 140 is triggered by mobile query service 100 to fulfill a successful query by mobile user 120. The fulfillment on behalf of, and directed to, the mobile user 120 is varied and can include, but is not limited to, direct marketing, commerce, and informational content. The mode of the response is variable and can include, but is not limited to, contact by voice, by internet chat, through additional email and text messages, through digital multimedia, by website referral, and through postal mail or package.

Actions taken may be either automatic or interactive. An automatic action, which is performed on behalf of, and unassisted by mobile user 120, is variable and can include, but is not limited to, sweepstakes entry, signup for free sample, signup for calendar reminder messages, signup for magazine subscription, add product to gift registry, add product to personal shopping list, signup for club membership, creation of personal blog entries linking corresponding web content, and interest reminder in the form of advertisement information in an email. An interactive action which requires either real-time or deferred engagement of mobile user 120 through mobile network 130 and camera phone 121 or internet 131 and computer terminal 122, can include, but is not limited to, mobile commerce, e-commerce, online contest entry, online voting, online gambling, and downloading mobile content such as ring-tones and games. All automatic actions may alternatively be acted on via interactive prompt if it is the user's desire to explicitly control certain actions on a query by query basis. The actual behavior of the mobile query system experienced by mobile user 120 is determined by the custom action-response record corresponding to each visual cue supported by the mobile query service 100. Mobile user 120 can directly affect this behavior by establishing personal preferences through user preference interface 232 of mobile query service 100.

Figure 2:
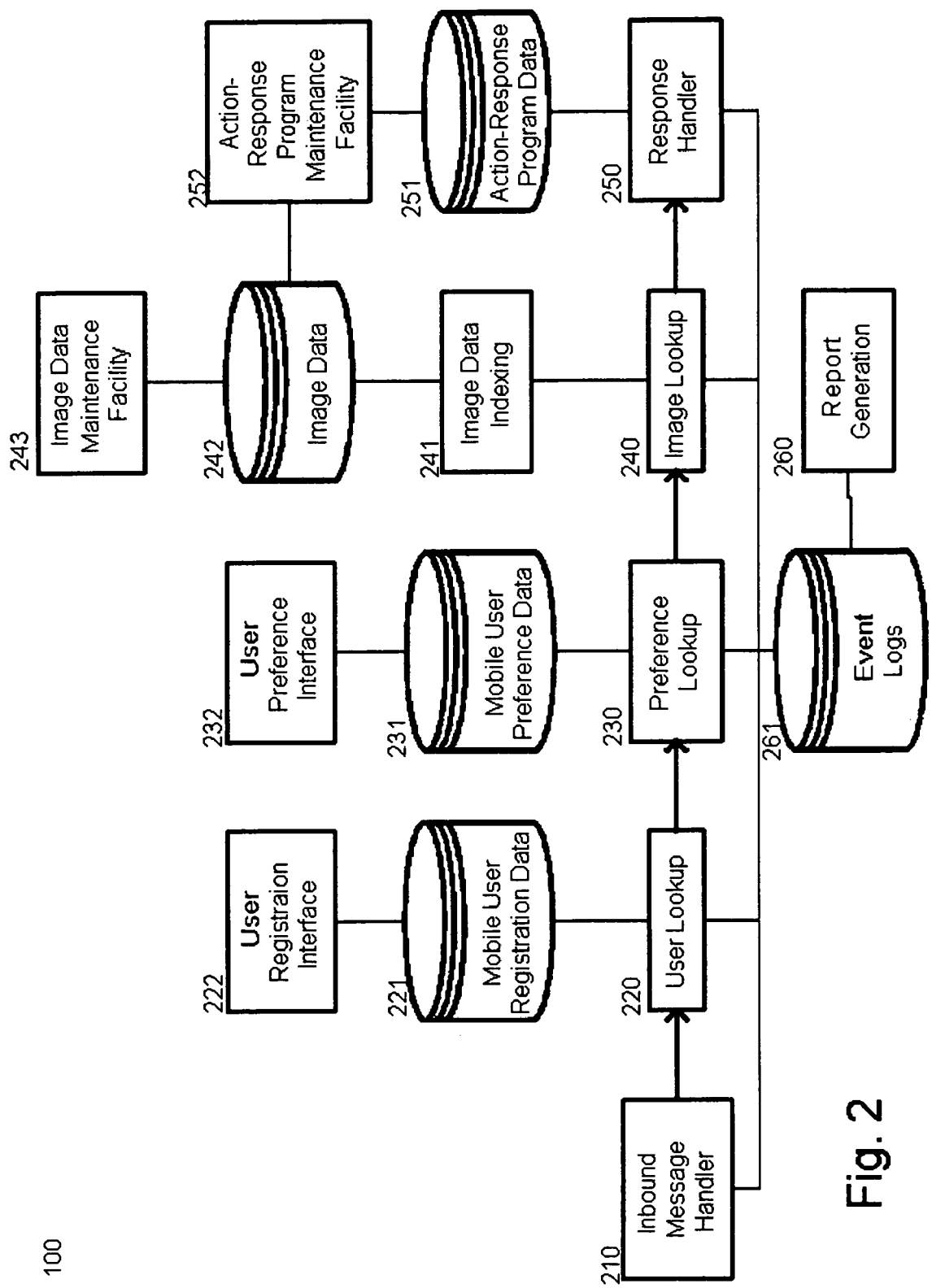
FIG. 2 is a block diagram of the preferred embodiment of the mobile query service for the invention.
Figure 3:
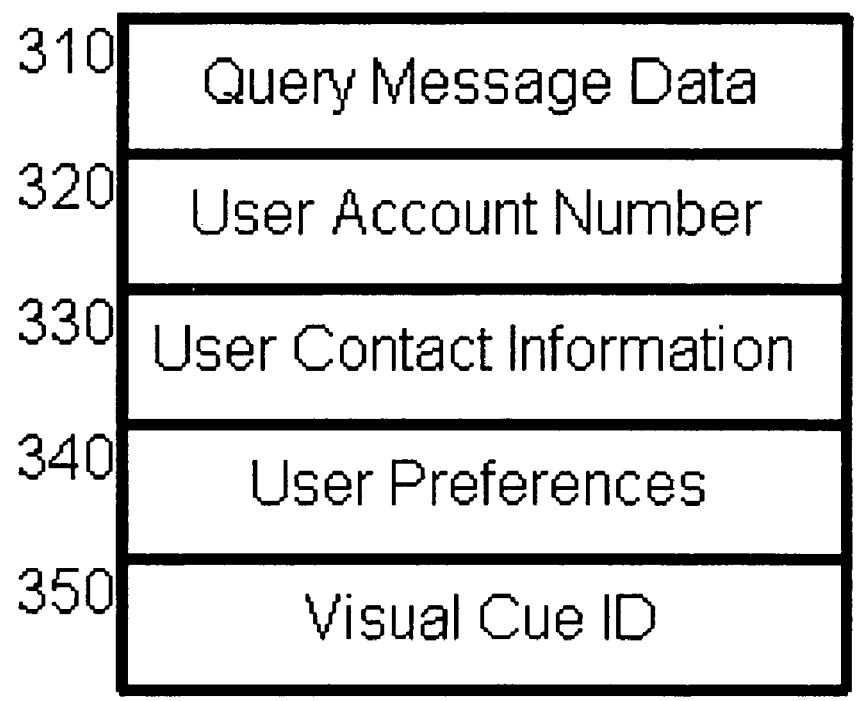
FIG. 3 is an example of a query record for the invention.

In FIG. 2, the inbound message handler 210 and the user lookup 220 and the preference lookup 230 and the image lookup 240 collectively produce the query record 300 shown in FIG. 3, which is passed to response handler 250. The inbound message handler 210 receives query messages from mobile network 130. At a minimum, the query message contains the following information: the user's mobile phone number, a digital image of the visual cue, and an indicator of mobile network vendor which transported the message. This information is extracted from the message and passed to user lookup 220 as query message data 310, included in newly created query record 300. In user lookup 220, the mobile phone number is used to lookup the user in mobile user registration data 221. If the user is found then registration data for that user is added to query record 300 as user contact information 330. The user account number 320 is also added to query record 300. If the user is not found, then the user account number 320 is null. User lookup 220 then passes partially completed query record 300 to preference lookup 230. Preference lookup 230 uses the user account number 320 to lookup this user's personal preferences in mobile user preference data 231. These preferences are added to query record 300 as user preferences 340. If the user account number 320 is null, no lookup is performed and user preferences 340 is set to null. Preference lookup 230 then passes partially completed query record 300 to image lookup 240. Image lookup 240 uses the digital image of the visual cue contained in query message data 310 to request an indication of best match or no match from image data indexing 241. Visual cue ID 350 for the best match is added to query record 300. If there is no match, then visual cue ID 350 is set to null in query record 300. Image lookup 240 then passes completed query record to response handler 250.

Figure 4:
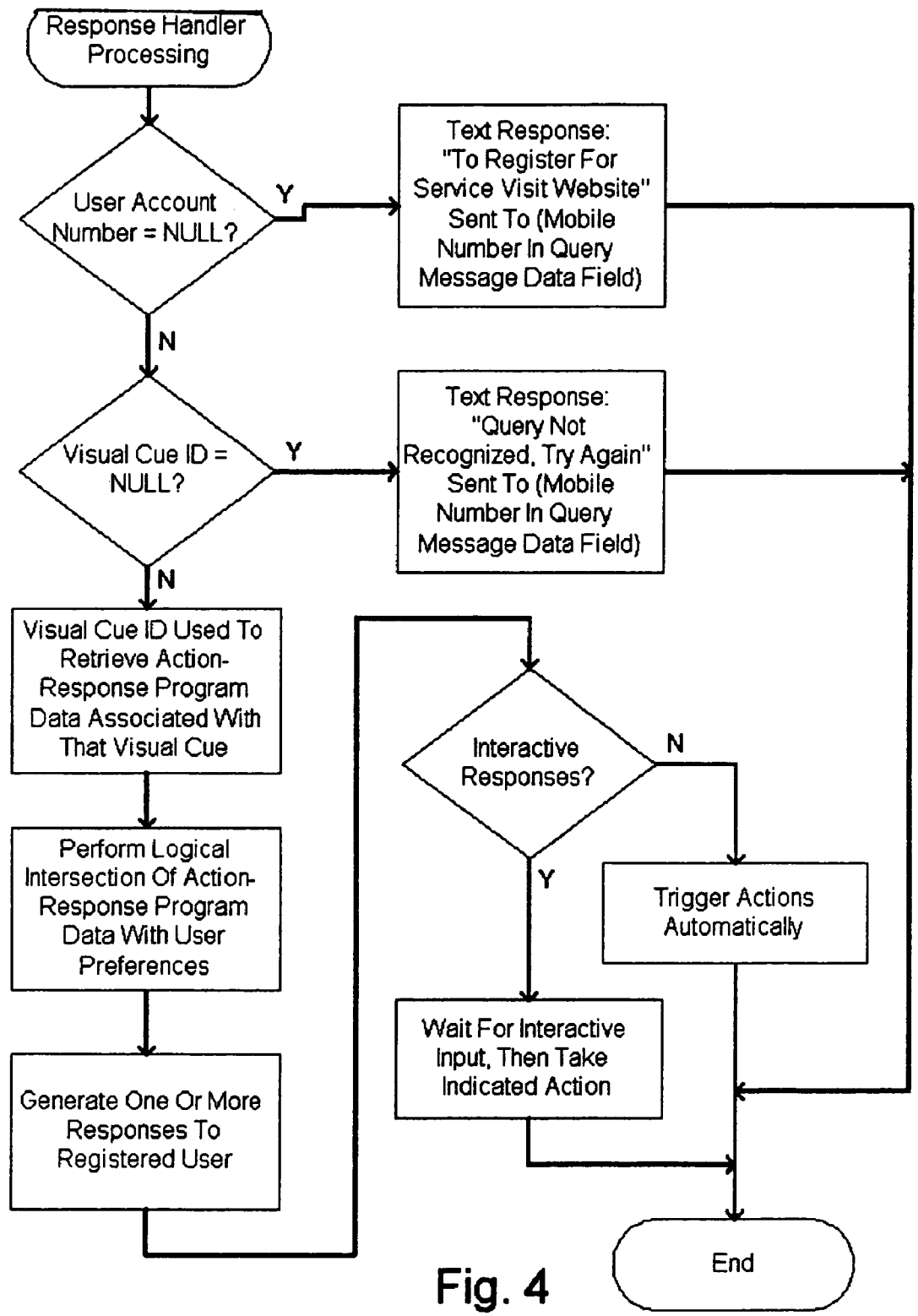
FIG. 4 is a flow chart of a response handler for the invention.

FIG. 4 shows the control flow of response handler 250 which accesses query record 300 to perform its task. The task is to determine and send the appropriate responses and generate the appropriate actions, if any, based on the mobile user's 120 query, the user's preferences, and the action-response program data 251. Actions are fulfilled by affiliates 140. To trigger fulfillment of these actions, response handler 250 determines the type of action and reformats user contact information 330 to a prearranged format. This data is then delivered periodically or in real-time by electronic means such as bulk FTP file transfer, e-mail, or web service interface, or it may be printed and delivered via post or package courier. The method, address, and format of communication to affiliates 140 is included in action-response program data 251.

When response handler 250 determines that a text message response should be sent to mobile user 120, the text message is addressed to the mobile number in query message data 310. To handle multiple, independent mobile networks, the mobile network operator in query message data 310 is retrieved to determine which mobile network gateway service to route the text message to. When response handler 250 determines that an email response should be sent to mobile user 120, the email is addressed to the email address in user contact information 330.

A possible response is to provide the address of the physical location nearest to mobile user 120 of a specific retailer. If the current location of mobile user 120 is available from mobile network 130 then that is used to compute the nearest retailer. If not, then if the registration zip code of mobile user 120 was provided through user registration interface 222 it is available for use by response handler 250 in user contact information 330 and is used to compute the nearest retailer. If not, then if the billing zip code of mobile user 120 is available from mobile network 130, then that is used to compute the nearest retailer. If not, then the response generated indicates that location-based responses are not possible until registration zip code is provided through user registration interface 222. Retail locations are stored in action-response program data 251 or are dynamically retrieved by response handler 250 using internet based web services.

A possible response is to enable mobile user 120 to make a purchase of the product in visual cue 110 using mobile commerce capabilities of mobile phone 121. In this case the response provides a direct link to the product purchase mobile web page for mobile user's 120 preferred mobile commerce retailer. This direct link allows the mobile user 120 to bypass the steps of traversing the mobile web pages to find the product of interest. Response handler 250 determines from action-response program data 251 if mobile commerce redirection is enabled for this query. If so, and user preferences 330 provides a preferred mobile internet retailer, then the response generated includes a link to the product purchase mobile web page of this mobile internet retailer, which is retrieved from action-response program data 251. Mobile user 120 then has the option to purchase the product indicated in visual cue 110.

Action-response program maintenance facility 252 provides operation and maintenance functions for creating, updating, and deleting action-response program data records. Records in action-response program data 251 and image data 242 share a common field. This is the visual cue ID 350. An action-response program data record has one or more corresponding records in image data 242, i.e., multiple images can point to a single response program. An action-response program data record is retrieved using visual cue ID 350.

Image data maintenance facility 243 provides operation and maintenance functions for creating, updating and deleting image data records. Input from affiliates 140 is provided in either digital or physical form, the latter scanned and converted to digital by image data maintenance facility 140. Alternative input formats for representing image data, such as TIFF, PDF, EPS, DCS2, JPEG, are accepted and normalized for use with image data indexing 241 prior to storage in image data 242. Image data records are created with a unique ID known as visual cue ID 350 which provides the link to corresponding records in response program data 251. When at least one corresponding action-response program record is linked to a new image data record, the new record is flagged as available for use and will be available to image data indexing 241 for matching.

Figure 5:
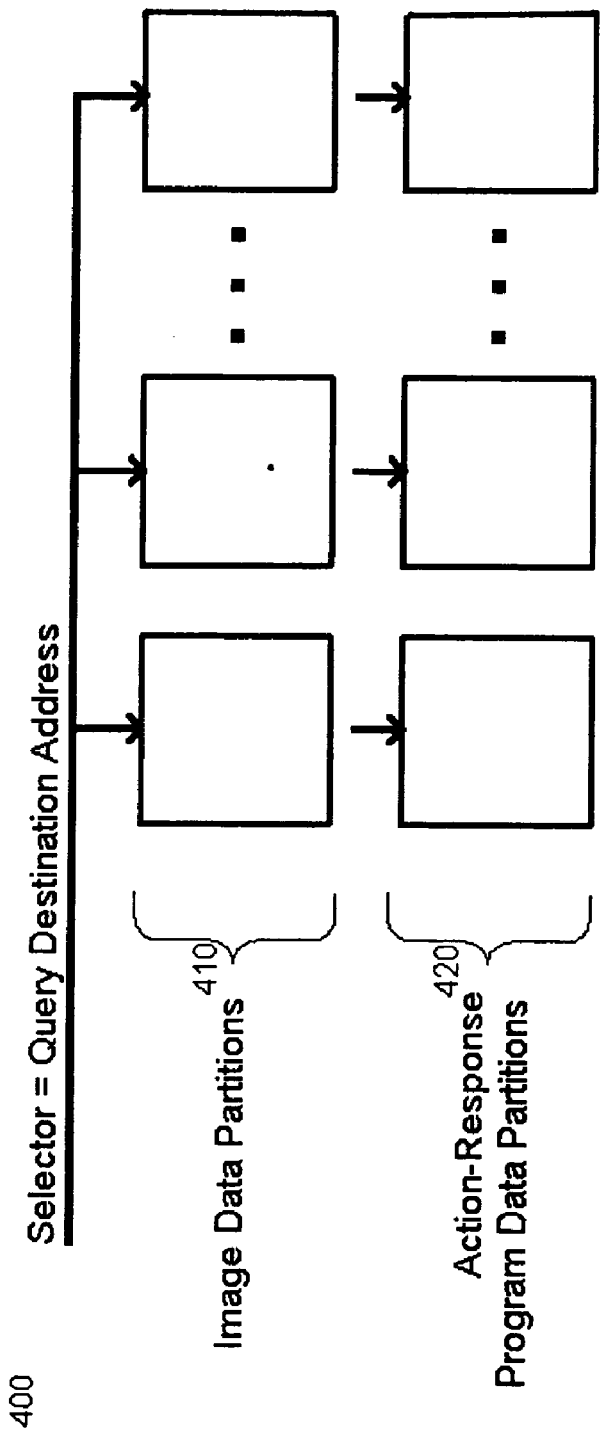
FIG. 5 is a diagram of service address based partitioning for the invention.

Affiliates 140 may choose to use the mobile query system for a specific promotional program or with a specific media outlet, such as a specifically named magazine. FIG. 5 shows how query destination address 430 is used to partition the image data 242 and the action-response program data 251. This provides the capability to manage and track multiple, affiliate based programs by creating unique addressing. Mobile user 120 is informed that to participate in a certain promotion, or with a certain media outlet, a specific query destination address 430 should be used for all communication. Queries received by inbound message handler 210 are processed to extract the query destination address from the received message and add this to query message data 310. Response handler 250 uses the query destination address to select the appropriate image data partition 410 and action-response program data partition 420, which are matched one to one. A separate partition is maintained for the generic address of the mobile query service. Both email address format and mobile network number format addressing schemes are supported. The mobile network numbering plan includes "short code" addressing, which is also supported.

User registration interface 222 and user preference interface 232 are accessed by mobile user 120 to input contact information, personal information, and operational preference information. A common implementation is as an internet web site and accessed via computer terminal 122. It may also be implemented as a mobile internet web site and accessed through mobile phone 121. Mobile user 120 may occasionally revisit these interfaces to provide additional information and update preferences. In this way mobile user 120 can increase or decrease the level of participation with the mobile query service.

Event logs 261 are created and maintained for tracking usage of the system. Data is logged from all main processing components. The event logging 261 and report generation system 260 provide support for the business goals of the mobile query service by delivering appropriate data to affiliates 140, such as customer leads, advertisement performance, media outlet performance, demographic data, and subscriber patterns. Report generation 260 includes a privacy policy monitor function to limit disclosure of personal data to prescribed levels.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. A method of accomplishing a mobile query and response system based on visual cues, in which a mobile user captures and transmits an image of a visual cue with a networked mobile device with image capture and transmission capabilities over a wireless network data service, comprising:
   receiving a query from the mobile user over the wireless network data service, where the query comprises the image captured and transmitted by the mobile user with the networked mobile device;
   providing a mobile user registration database comprising searchable records having information associated with one or more registered mobile users;
   searching the mobile user registration database to determine if the mobile user is a registered mobile user;
   sending a reply to the mobile user over the wireless network data service if the mobile user is not a registered mobile user, where the reply comprises text informing the mobile user how to register to use the mobile query and response system;
   providing a mobile user preference database comprising searchable records having operational preference information associated with one or more registered mobile users;
   receiving operational preference information from the mobile user and storing the operational preference information in the mobile user preference database;
   searching the mobile user preference database to determine if the registered mobile user has an operational preference;
   providing an image database comprising searchable records having stored images and response information associated with the stored images;
   searching the image database for the image captured and transmitted by the mobile user and retrieving the response information associated with such image; and
   sending a reply to the mobile user over the wireless network data service, where the reply comprises the retrieved response information, if the image captured and transmitted by the mobile user is found in the image database.

2. The method of claim 1, where the reply to the mobile user comprises text informing the mobile user how to use the mobile query and response system, if the image captured and transmitted by the mobile user is not found in the image database.

3. The method of claim 1, where the step of searching the mobile user registration database to determine if the mobile user is a registered mobile user is based at least in part on an identification of the networked mobile device from which the image is received.

4. The method of claim 1, further comprising the step of receiving interactive input from the mobile user after sending the reply comprising the retrieved response information to the mobile user.

5. The method of claim 1, further comprising the step of logging information associated with at least one of the query from the mobile user or the reply to the mobile user.

6. The method of claim 5, further comprising the step of generating a report from the logged information.

7. The method of claim 1, further comprising the step of maintaining the records in the image database.

8. The method of claim 7, further comprising the step of modifying a record in the image database.

9. The method of claim 1, further comprising the step of identifying the media outlet that was the source of the captured image.

10. The method of claim 9, where identifying the media outlet that was the source of the captured image comprises using a publication cover as an identifying image.

11. The method of claim 9, where identifying the media outlet that was the source of the captured image comprises tracking and analyzing at least recent past queries from the mobile user.

12. The method of claim 9, where identifying the media outlet that was the source of the captured image comprises the mobile user selecting a source from a series of choices communicated to the mobile device.

13. The method of claim 9, where identifying the media outlet that was the source of the captured image comprises determining the date, time, and location of the query.

14. The method of claim 9, where the networked mobile device is a mobile telephone or personal digital assistant (PDA).

15. The method of claim 1, where the networked mobile device comprises a digital camera.

16. The method of claim 1, where the retrieved response information comprises product source information.

17. The method of claim 1, where the retrieved response information comprises providing a direct link to a web page.

18. The method of claim 1, where the retrieved response information comprises product information.

19. The method of claim 1, where the retrieved response information comprises content provider information.

20. The method of claim 1, where the retrieved response information comprises video images.

21. The method of claim 1, where the retrieved response information comprises still images.

22. The method of claim 1, where the retrieved response information comprises audio information.

23. The method of claim 1, where the reply comprises an email or postal mail message.

24. The method of claim 1, where the reply comprises a telephone contact.

25. A method of accomplishing a mobile query and response system based on visual cues, in which a mobile user captures and transmits an image of a visual cue with a networked mobile device with image capture and transmission capabilities over a wireless network data service, comprising:

receiving a query from the mobile user over the wireless network data service, where the query comprises the image captured and transmitted by the mobile user with the networked mobile device;

providing a mobile user registration database comprising searchable records having information associated with one or more registered mobile users;

searching the mobile user registration database to determine if the mobile user is a registered mobile user, based at least in part on an identification of the networked mobile device from which the image is received;

sending a reply to the mobile user over the wireless network data service if the mobile user is not a registered mobile user, where the reply comprises text informing the mobile user how to register to use the mobile query and response system;

providing a mobile user preference database comprising searchable records having operational information associated with one or more registered mobile users;

receiving operational preference information from the mobile user and storing the operational preference information in the mobile user preference database;

searching the mobile user preference database to determine if the registered mobile user has an operational preference;

providing an image database comprising searchable records having stored images and response information associated with the stored images;

searching the image database for the image captured and transmitted by the mobile user and retrieving the response information associated with such image; and sending a reply to the mobile user over the wireless network data service, where the reply comprises the retrieved response information, if the image captured and transmitted by the mobile user is found in the image database and where the reply to the mobile user comprises text informing the mobile user how to use the mobile query and response system, if the image captured and transmitted by the mobile user is not found in the image database.

26. The method of claim 25, further comprising the step of receiving interactive input from the user after sending the response comprising the retrieved response information to the mobile user.

27. The method of claim 25, further comprising the steps of:

logging information associated with at least one of the query from the mobile user or the response to the mobile user; and generating a report from the logged information.

28. The method of claim 25, further comprising the step of maintaining the records in the image database.

29. The method of claim 25, further comprising the step of determining the media outlet that was the source of the captured image.

30. The method of claim 29, where identifying the media outlet that was the source of the captured image comprises using a publication cover as an identifying image.

31. The method of claim 29, where identifying the media outlet that was the source of the captured image comprises tracking and analyzing at least recent past queries from the mobile user.

32. The method of claim 29, where identifying the media outlet that was the source of the captured image comprises the mobile user selecting a source from a series of choices communicated to the mobile device.

33. The method of claim 29, where identifying the media outlet that was the source of the captured image comprises determining the date, time, and location of the query.

* * * * *